US011489392B2

(12) United States Patent
Horiuchi et al.

(10) Patent No.: US 11,489,392 B2
(45) Date of Patent: Nov. 1, 2022

(54) BOBBIN STRUCTURE OF ARMATURE

(71) Applicant: SANYO DENKI CO., LTD., Tokyo (JP)

(72) Inventors: Manabu Horiuchi, Tokyo (JP); Hiroki Sagara, Tokyo (JP); Jun Kitajima, Tokyo (JP); Mai Shimizu, Tokyo (JP); Takashi Matsushita, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 158 days.

(21) Appl. No.: 16/719,018

(22) Filed: Dec. 18, 2019

(65) Prior Publication Data

US 2020/0204031 A1 Jun. 25, 2020

(30) Foreign Application Priority Data

Dec. 25, 2018 (JP) .............................. JP2018-240519

(51) Int. Cl.
*H02K 3/34* (2006.01)
*H02K 1/14* (2006.01)
(Continued)

(52) U.S. Cl.
CPC ............... *H02K 3/345* (2013.01); *H02K 3/34* (2013.01); *H02K 1/146* (2013.01); *H02K 3/20* (2013.01);
(Continued)

(58) Field of Classification Search
CPC .... H02K 3/345; H02K 2203/12; H02K 3/522; H02K 3/20; H02K 1/146; H02K 1/148;
(Continued)

(56) References Cited

U.S. PATENT DOCUMENTS

2004/0095035 A1\* 5/2004 Sogabe .................. H02K 1/146
310/216.092
2006/0028087 A1 2/2006 Ionel et al.
(Continued)

FOREIGN PATENT DOCUMENTS

EP 2763290 A2 8/2014
JP 8-130844 A 5/1996
(Continued)

OTHER PUBLICATIONS

Japanese Office Action (JPOA) dated Dec. 3, 2019 issued in the corresponding Japanese Patent Application No. 2018-240519.
(Continued)

*Primary Examiner* — Alexander A Singh
(74) *Attorney, Agent, or Firm* — Rankin, Hill & Clark LLP (57) ABSTRACT

A bobbin structure of an armature of a three-phase motor having 6N (N is a natural number) slots and 3N coils per phase, the bobbin structure including: a main pole into which a winding bobbin around which a coil is wound is inserted; and an auxiliary pole into which an empty bobbin around which the coil is not wound is inserted. The main pole and the auxiliary pole are placed in a circumferential direction with respect to a rotation axis, and a contact portion where the empty bobbin and the winding bobbin are
(Continued)

in contact with each other is formed on each of an outer peripheral side and an inner peripheral side of the slot formed between the main pole and the auxiliary pole.

11 Claims, 8 Drawing Sheets

(51) Int. Cl.
    *H02K 3/20*      (2006.01)
    *H02K 3/52*      (2006.01)

(52) U.S. Cl.
    CPC ......... *H02K 3/522* (2013.01); *H02K 2203/03* (2013.01); *H02K 2203/12* (2013.01)

(58) Field of Classification Search
    CPC .......... H02K 1/141; H02K 29/03; H02K 3/44; H02K 3/46; H02K 3/47; H02K 3/48; H02K 3/487; H02K 3/493; H02K 3/18; H02K 1/165; H02K 3/28; H02K 1/12; H02K 1/14; H02K 1/16; H02K 1/00; H02K 1/02; H02K 1/04; H02K 1/06; H02K 1/08; H02K 1/10; H02K 3/34
    USPC .... 310/215, 214, 216.087, 216.001, 216.074
    See application file for complete search history.

(56) References Cited

U.S. PATENT DOCUMENTS

| | | | | |
|---|---|---|---|---|
| 2009/0127972 | A1* | 5/2009 | Ishida | .................... H02K 1/148 310/216.074 |
| 2010/0052462 | A1* | 3/2010 | Sugishima | ............. H02K 3/345 310/215 |
| 2014/0210303 | A1 | 7/2014 | Harada et al. | |
| 2018/0166932 | A1* | 6/2018 | Desai | ....................... H02K 3/28 |

FOREIGN PATENT DOCUMENTS

| | | |
|---|---|---|
| JP | 8-182265 A | 7/1996 |
| JP | 2010-57277 A | 3/2010 |
| JP | 2015-211563 | 11/2015 |

OTHER PUBLICATIONS

Extended European Search Report (EESR) dated May 7, 2020 issued in the corresponding European Patent Application No. 19217661.8.

\* cited by examiner

BOBBIN STRUCTURE OF ARMATURE

CROSS-REFERENCE TO RELATED APPLICATION

This application claims priority from Japanese Patent Application No. 2018-240519 filed with the Japan Patent Office on Dec. 25, 2018, the entire content of which is hereby incorporated by reference.

BACKGROUND

1. Technical Field

The present disclosure relates to a bobbin structure of an armature.

2. Related Art

Figure 1:
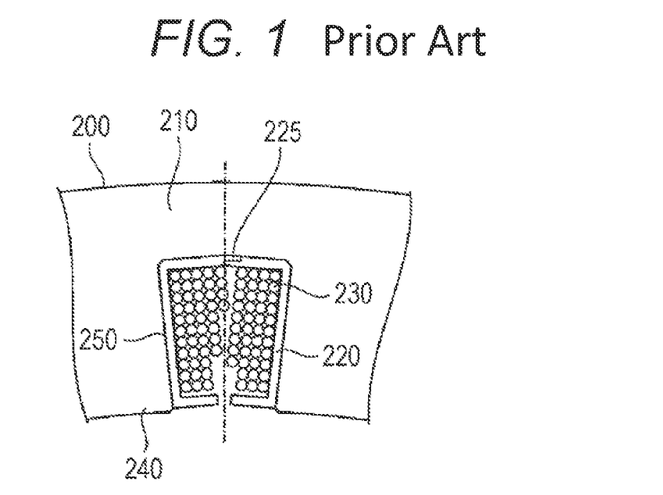
FIG. 1 is a diagram illustrating an example of a bobbin structure of an armature described in JP-A-2015-211563.

There has conventionally been a technology that uses coil bobbins (winding bobbins) 220 and 250 to provide electrical insulation between a coil 230 and a core 210 in an armature 200 with concentrated windings as illustrated in FIG. 1. For example, in JP-A-2015-211563 described below, flange portions 225 are placed in such a manner that the bobbins 220 and 250 overlap each other at bottom portions of the coil bobbins 220 and 250 as in FIG. 1. Consequently, the insulation distance between the coil 230 and the core 210 is increased in a stator of the rotating armature 200 with concentrated windings including the coil bobbins 220 and 250. The stator coil 230 can also be wound near the overlapping flange portions 225. Hence, it is possible to increase the fill factor of the coil 230 inside the slot 250. In this manner, in the technology of JP-A-2015-211563, the coil 230 can be placed in the space of the slot 250, and accordingly the coil 230 can be placed with high space efficiency.

SUMMARY

A bobbin structure of an armature of a three-phase motor having 6N (N is a natural number) slots and 3N coils per phase, the bobbin structure including: a main pole into which a winding bobbin around which a coil is wound is inserted; and an auxiliary pole into which an empty bobbin around which the coil is not wound is inserted. The main pole and the auxiliary pole are placed in a circumferential direction with respect to a rotation axis, and a contact portion where the empty bobbin and the winding bobbin are in contact with each other is formed on each of an outer peripheral side and an inner peripheral side of the slot formed between the main pole and the auxiliary pole.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, if only the winding bobbin is placed as illustrated in FIG. 1, the insulation properties between adjacent coils may be deteriorated.

An object of the present disclosure is to provide a bobbin structure of an armature where the insulation properties have been improved.

Means for Solving the Problem

According to one aspect of the present disclosure, a bobbin structure of an armature is provided which is a bobbin structure of an armature where, in a three-phase motor having 6N (N is a natural number) slots of a motor armature, and 3N coils per phase, a main pole into which a winding bobbin around which a coil is wound is inserted, and an auxiliary pole into which an empty bobbin around which the coil is not wound is inserted are placed in a circumferential direction with respect to a rotation axis, characterized in that a contact portion where the empty bobbin and the winding bobbin are in contact with each other is formed on each of an outer peripheral side and an inner peripheral side of the slot formed between the main pole and the auxiliary pole.

The contact portion where the empty bobbin and the winding bobbin are in contact with each other is formed to allow the empty bobbin to cover the winding bobbin. As a result, the insulation properties of the winding can be improved.

Preferably, in the contact portion on the outer peripheral side of the slot, at least parts of the empty bobbin and the winding bobbin fit together, and the contact portion includes an opening portion.

At least the parts fit together; accordingly, the movement of the empty bobbin and the winding bobbin in a direction extending in the rotation axis can be regulated. Moreover, the opening portion is provided. Accordingly, the heat transfer properties from the coil to the iron core can be improved.

Preferably, a groove or hole is formed on the outer peripheral side of the empty bobbin.

Consequently, it is designed to allow molding resin to reach the coil. Accordingly, resin molding can be performed. Moreover, the heat dissipation effect of the motor can be improved.

Preferably, a base portion is provided which includes, at an end portion thereof, a base having a mounting surface where an end portion on an inner or outer diameter of a printed board is mounted, the base portion protruding from a side surface of the empty bobbin in a rotation axis direction.

The base portion is provided which includes, at the end portion, the base where the end portion on the inner or outer diameter of the doughnut-shaped printed board is mounted. Accordingly, the position of the printed board can be determined.

Preferably, a tapered portion of a taper shape where the base portion tapers to an outer side in the rotation axis direction is provided on a surface opposite to the mounting surface of the base portion.

Consequently, if the armature including the printed board and the base portion is integrally molded with resin, the molded resin on the inner peripheral side of the printed board can be formed into a taper shape. Therefore, a component and the like can be placed in a space created by forming the taper shape.

According to the present disclosure, a bobbin structure of an armature where insulation properties is improved can be provided.

According to the study of the deterioration of insulation properties, when a winding is molded with resin by, for example, cast molding or injection molding after being wound, part of a conductor is pushed out by the resin injection pressure. The electric wire collapses, starting at the disordered winding area, and comes into contact with the core of the armature to result in a ground fault. Such a thing is a cause of the deterioration of insulation properties.

In this manner, improving the winding fill factor and forming a resin molded winding obtained by cast molding or injection molding reduce the temperature of the armature in a rotating machine; as a result, it leads to an increase in the output of the rotating machine.

However, there is a need to fully fill resin to secure insulation performance.

Considering the above points, a bobbin structure of an armature according to one embodiment of the present disclosure is described in detail hereinafter with reference to the drawings.

A (winding) bobbin is a tube for forming a coil by winding an electric wire around the tube. This can be made of an insulating material. Moreover, an empty bobbin is a bobbin around which an electric wire (coil) is not wound.

Moreover, a periphery closer to a rotation axis C of a motor is referred to as the inner periphery, and a periphery farther from the rotation axis C is referred to as the outer periphery. A direction along the rotation axis is referred to as the rotation axis direction, and a direction extending radially with the rotation axis as the center is referred to as the radial direction. Moreover, a rotating direction about the rotation axis is referred to as the circumferential direction. A side closer to the rotation axis with the rotation axis as the center is referred to as the inner peripheral side, and a side farther from the rotation axis is referred to as the outer peripheral side. In this manner, the positional relationship is described with reference to the rotation axis.

First Embodiment

A first embodiment of the present disclosure is described below.

In the embodiment, a function is added to the empty bobbin part around which a wire is not wound. Accordingly, the empty bobbin is used with a view to solving the above problems.

Figure 2:
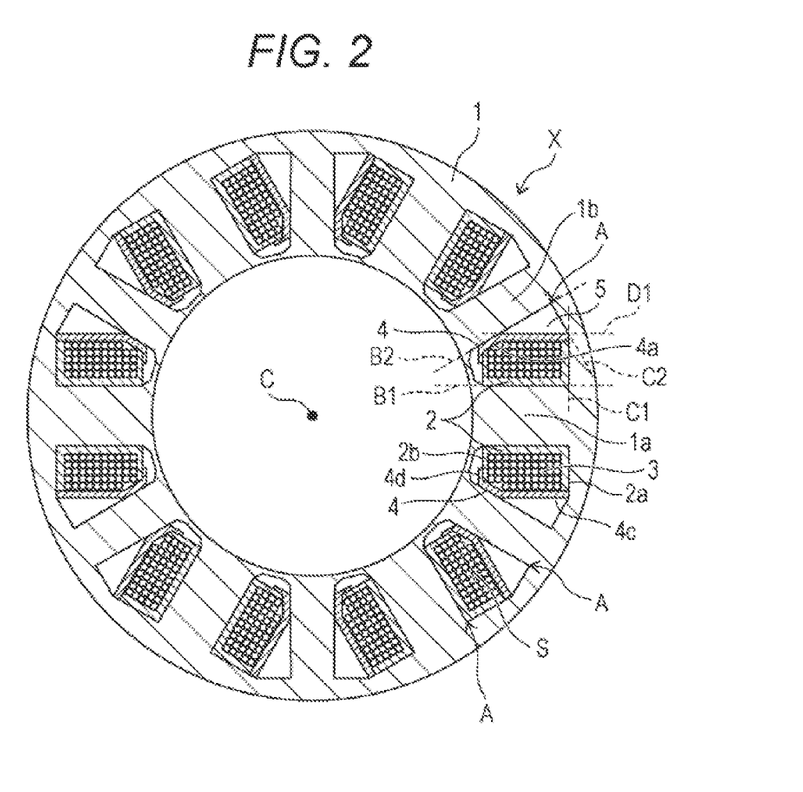
FIG. 2 is a diagram illustrating example of a cross-sectional structure in a rotation axis direction of an armature according to an embodiment of the present disclosure, and also illustrates coils.

FIG. 2 is a diagram illustrating an example of a cross-sectional structure taken along a plane where the rotation axis of an armature X of a motor is a normal. In addition, FIG. 2 is a diagram illustrating coils. A reference numeral C denotes the rotation axis of the motor. The armature X of the motor is, for example, a cylindrical armature where a rotor (mover) that rotates is placed on the inner peripheral side of the armature X.

Figure 3A:
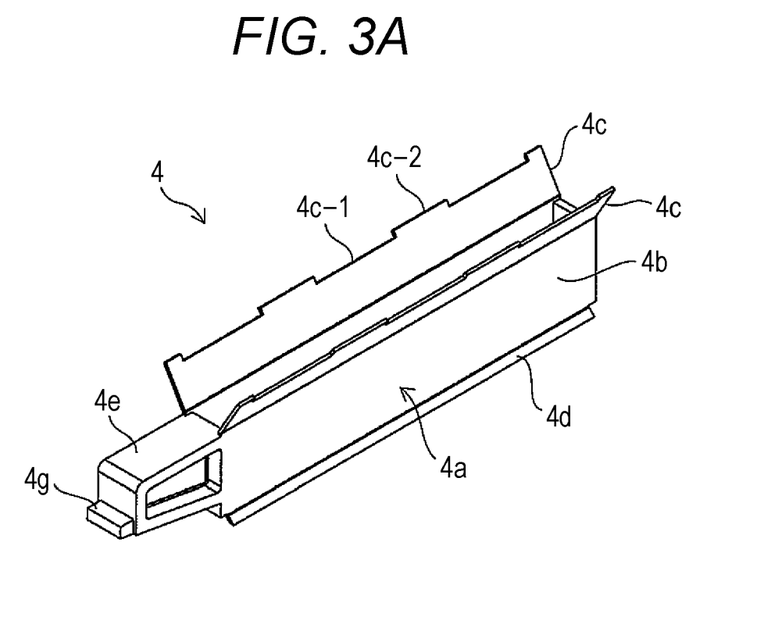
FIG. 3A is a perspective view of an empty bobbin according to the embodiment.
Figure 3B:
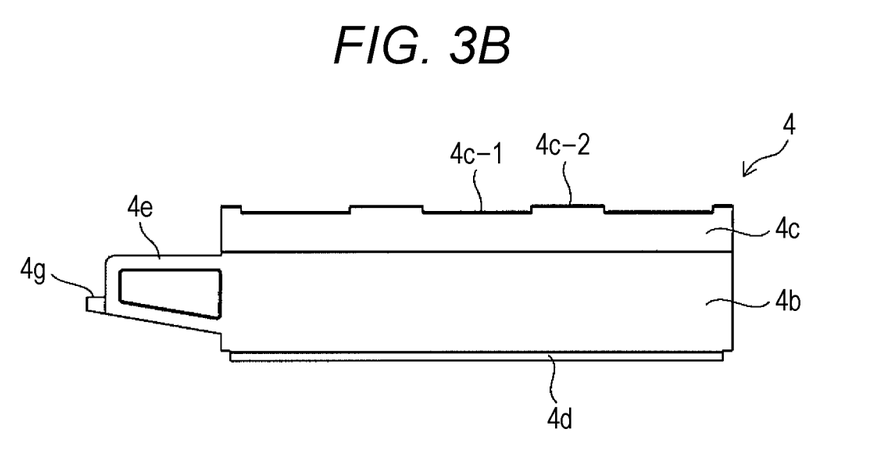
FIG. 3B is a side view of the empty bobbin.

In the example illustrated in FIG. 2, the number of slots (S) provided in an iron core 1 is 6N a natural number). The number of coils (3) is 3N. The number of coils is half the number of slots. Consequently, main poles 1a into each of which a winding bobbin 2 around which the coil 3 is wound is inserted, and auxiliary poles 1b into each of which an empty bobbin 4 around which the coil 3 is not wound is inserted are alternately placed in the iron core 1. FIG. 3A is a perspective view of the empty bobbin according to the embodiment. On the other hand, FIG. 3B is a side view of the empty bobbin.

In the configuration illustrated by example in FIGS. 2 and 3A, root portions (end portions on the outer peripheral side) A of the main pole 1a and the auxiliary pole 1b, lines (virtual lines; the same hereinafter) C1 and C2 along the substantially circumferential direction, the lines C1 and C2 being perpendicular to lines B1 and B2 indicating side surfaces of the main pole 1a and the auxiliary pole 1b in the cross-sectional view of FIG. 2 define an outer peripheral shape (bottom portion) of the slot.

In the cross-sectional view of FIG. 2, in an area surrounded by a line D1 (across the empty bobbin 4) along the outer side of the coil parallel to the line B1, the line B2 and the line C2, the lines D1, B2, and C2 form angles that intersect with each other. Hence, a gap 5 is formed between the coil 3 across the empty bobbin 4 and the auxiliary pole 1b.

As illustrated in FIG. 3A, a side wall portion 4b provided on each side of a housing portion 4a where the auxiliary pole 1b is inserted and housed, and empty bobbin-side first flange portions 4c configured in such a manner that the distance between the first flange portions 4c increases gradually from the side wall portions 4b toward the outer peripheral side with respect to the rotation axis C are formed on the empty bobbin 4. The above gap 5 is formed between the first flange portion 4c and the auxiliary pole 1b.

On the other hand, as illustrated in FIG. 2, a winding-side first flange portion 2a that covers the coil 3 is formed on the winding bobbin 2 on the outer peripheral side of the iron core 1. Furthermore, a winding-side second flange portion 2b that covers the coil 3 is also formed on the winding bobbin 2 on the inner peripheral side of the iron core 1.

In this manner, a first contact portion where the first flange portion 4c on the empty bobbin 4 side and the winding-side first flange portion 2a of the winding bobbin 2 are in contact at their edge portions with each other is provided on the outer peripheral side of the iron core 1.

Moreover, empty bobbin-side second flange portions 4d that increase gradually in distance between them from the side wall portion 4h of the empty bobbin 4 toward the inner diameter side of the iron core 1 are formed on the empty bobbin 4.

A second contact portion where the second flange portion 4d on the empty bobbin 4 side and the winding-side flange portion 2b of the winding bobbin 2 are in contact with each other by causing the flange portions 4d and 2b to overlap each other on their edge sides is provided on the inner peripheral side of the iron core 1. Consequently, an improvement in the insulation performance between the coils is also promoted on the inner peripheral side.

Moreover, the second flange portion 4d on the empty bobbin 4 side may be placed on the inner peripheral side with respect to the winding-side flange portion 2b of the winding bobbin 2. Consequently, it is possible to prevent the second flange portion 4d on the empty bobbin 4 side from entering the inside of the coil 3.

In the above configuration, the empty bobbin 4 allows the coil 3 to have a sufficient insulation distance from the auxiliary pole 1b. Hence, the coil 3 will not have a ground fault.

As described above, according to the embodiment, the insulation performance between the coils can be improved.

Second Embodiment

A second embodiment of the present disclosure is described below.

In the first embodiment, the first flange portions 4c are provided. Accordingly, the flange portions 4c act perfectly as walls, and the inside of the motor is enclosed. As a result, the heat generated from the coil 3 results in keeping trapped in spaces of the winding bobbin 2 and the empty bobbin 4.

FIG. 3A is a perspective view of the empty bobbin according to the embodiment. Moreover, FIG. 3B is a side view of the empty bobbin.

Figure 3C:
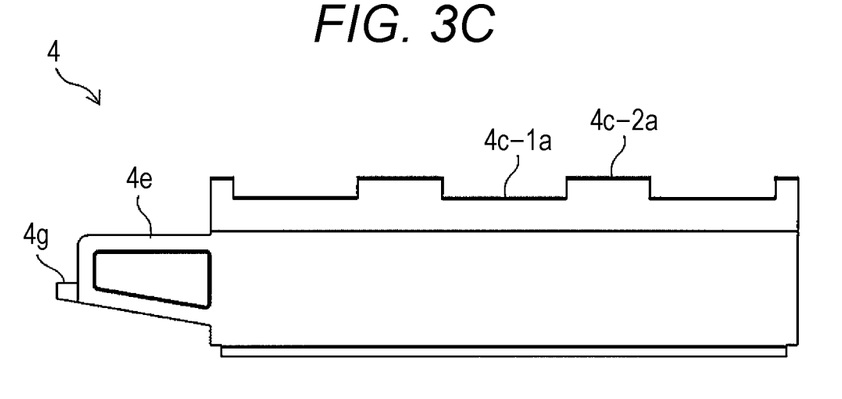
FIGS. 3C to 3E are side views illustrating examples of structures where a groove or hole has been formed in the empty bobbin.
Figure 3D:
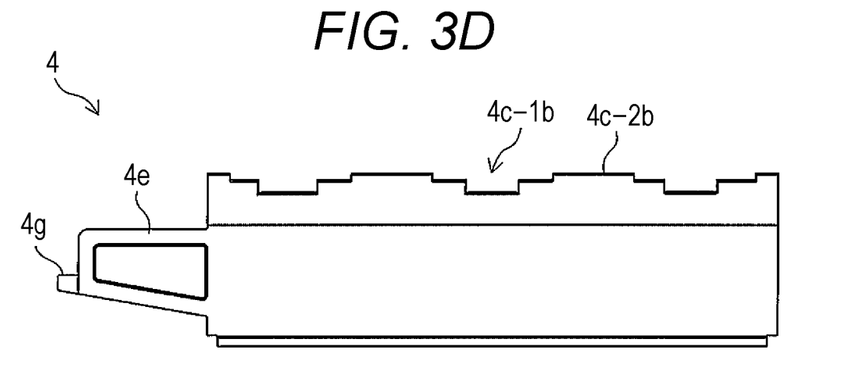
Figure 3E:
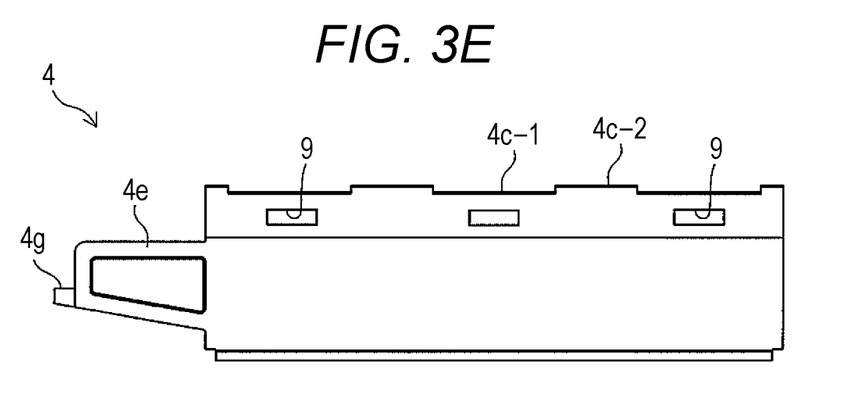

Moreover, FIGS. 3C to 3E are side views illustrating examples of structures where a groove or hole has been formed in the empty bobbin.

As illustrated in FIGS. 3A and 3B, in the embodiment, grooves or holes are formed in advance in the edge portions of the first flange portions 4c extending from the side wall 4b of the empty bobbin 4 toward the outer peripheral side of the iron core 1 in the cross-sectional view of FIG. 2 in such a manner as to expand the width of the empty bobbin 4. FIG. 3B illustrates an example where depressions and projections 4c-1 and 4c-2 are provided.

Figure 4A:
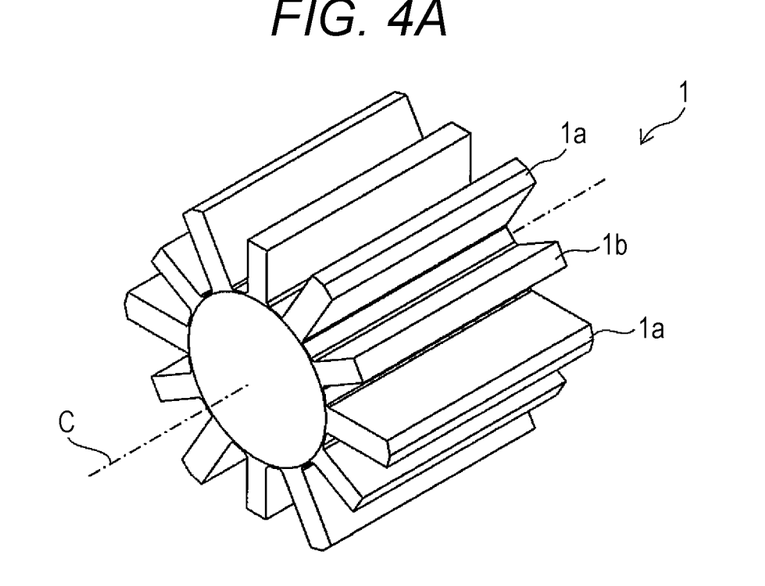
FIG. 4A is a perspective view of an iron core.
Figure 4B:
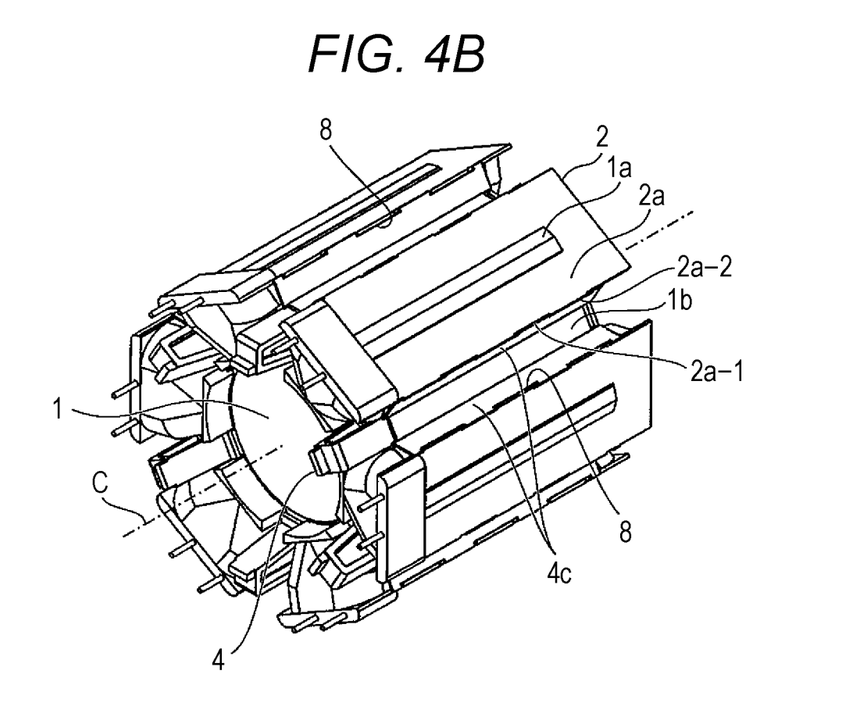
FIG. 4B is a perspective view illustrating an example of an assembled armature structure according to the embodiment.

FIG. 4A is a perspective view of the iron core. FIG. 4B is a perspective view illustrating an example of an assembled armature structure according to the embodiment. As illustrated in FIG. 4B, the wound winding bobbins 2 and the empty bobbins 4 have been alternately inserted into the iron core 1 (indicated with 1a and 1b) illustrated in FIG. 4A.

Depressed portions and projecting portions are alternately formed along the rotation axis C direction on each of depressions and projections 2a-1 and 2a-2 formed on the first flange portion 2a of the winding bobbin 2, and the edge portion of the first flange portion 4c of the empty bobbin 4. The first flange portion 2a of the winding bobbin 2 and the depression and projection structures 4c-1 and 4c-2 on the first flange portion 4c of the empty bobbin 4 fit together along the contact portion on the outer peripheral side. Consequently, the coil 3 is covered.

Moreover, as illustrated in, for example, FIG. 43, the depth of the depression of the depressed portion 4c-1 formed in the first flange portion 4c of the empty bobbin 4 can be increased as compared to the projection length of the projection of the projecting portion 2a-2 formed on the first flange portion 2a of the winding bobbin 2. Consequently, as illustrated in FIG. 4B, opening portions 8 can be formed after the bobbins are assembled.

In this manner, the projection-and-depression shape is provided on each of the winding bobbin 2 that is inserted into the main pole 1a and the outer peripheral side of the empty bobbin 4 that is inserted into the auxiliary pole 1b. As a result, the coil can be seen through the opening portion 8 in a state where the winding bobbin 2 and the empty bobbin 4 are mated as illustrated in FIG. 4B. Resin enters through the opening portion 8 and comes into intimate contact with the coil to ensure an improvement in thermal properties.

Therefore, it is possible to facilitate the release of the heat trapped in the spaces of the winding bobbin 2 and the empty bobbin 4 to the outside.

Moreover, in the embodiment, the molding work such as cast molding or injection molding with varnish, resin, or the like may be performed after assembly of windings. Consequently, the resin composition flowing through the gap 5 as a passage comes into contact with both of the coil 3 and the auxiliary pole 1b.

Therefore, there is no screen from the resin that has come into contact with the first flange portion 4c to the auxiliary pole 1b or the iron core back portion. Consequently, the heat transfer properties (heat dissipation properties) can be improved.

The structure of the opening portion 8 may be configured as follows:

FIGS. 3C to 3E are side views illustrating examples of structures where a groove or hole has been formed in the empty bobbin.

1) A depressed portion 4c-1a on the empty bobbin 4 side is made deeper than the projecting portion on the winding bobbin 2 side to form the opening portion 8 (FIG. 3C).

2) A depressed portion 4c-1b on the empty bobbin 4 side is formed as a multi-stepped depressed portion to form the opening portion 8 (FIG. 3D).

3) A hole portion 9 is further formed into a window shape below the depression on the empty bobbin 4 side (FIG. 3E).

In any structure including, but not limited to, the structures illustrated by example above, a groove or hole is formed on the outer peripheral side of the empty bobbin 4. Alternatively, a "groove or hole" is formed in a part of the contact portion on the outer peripheral side of the winding bobbin 2 and the empty bobbin 4.

Consequently, it is possible to perform resin molding by enabling molding resin to reach the coil 3 from the gap 5 (FIG. 2) through the opening portion 8. Moreover, the heat dissipation effect can be improved.

In addition, the edge portions of the winding bobbin 2 and the empty bobbin 4 (the contact portion) can fit together along the rotation axis C direction. Consequently, the movement of the winding bobbin 2 and the empty bobbin 4 in the rotation axis C direction can be regulated. Therefore, the winding bobbin 2 and the empty bobbin 4 can be fixed in the rotation axis direction.

Figure 5:
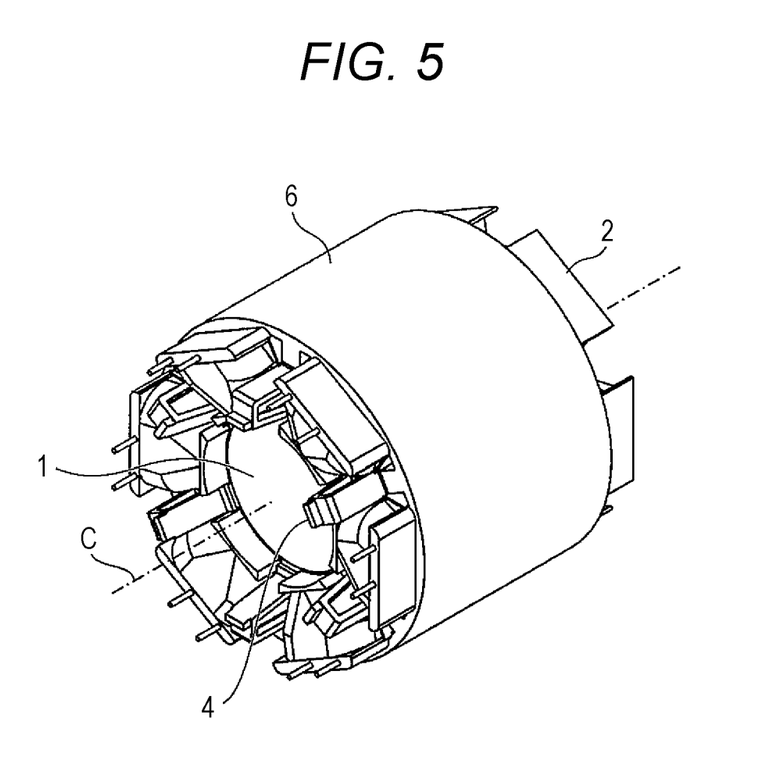
FIG. 5 is a perspective view illustrating an assembled armature yoke structure according to the embodiment.

FIG. 5 is a perspective view illustrating an example of an assembled armature yoke structure according to the embodiment. The structure illustrated in FIG. 5 is obtained by inserting the winding bobbins 2 into an armature yoke 6 in the state illustrated in FIG. 4B. Consequently, the assembly of an armature stator has been completed.

Figure 6A:
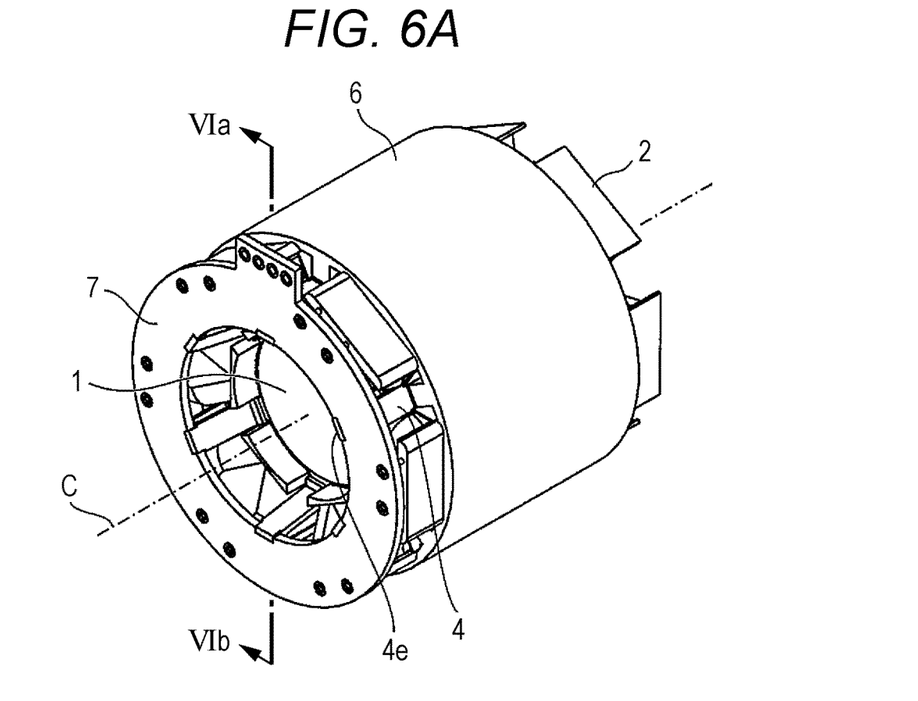
FIG. 6A is a perspective view of an assembled printed board structure where a printed board has been assembled in the assembled armature yoke structure according to the embodiment.
Figure 6B:
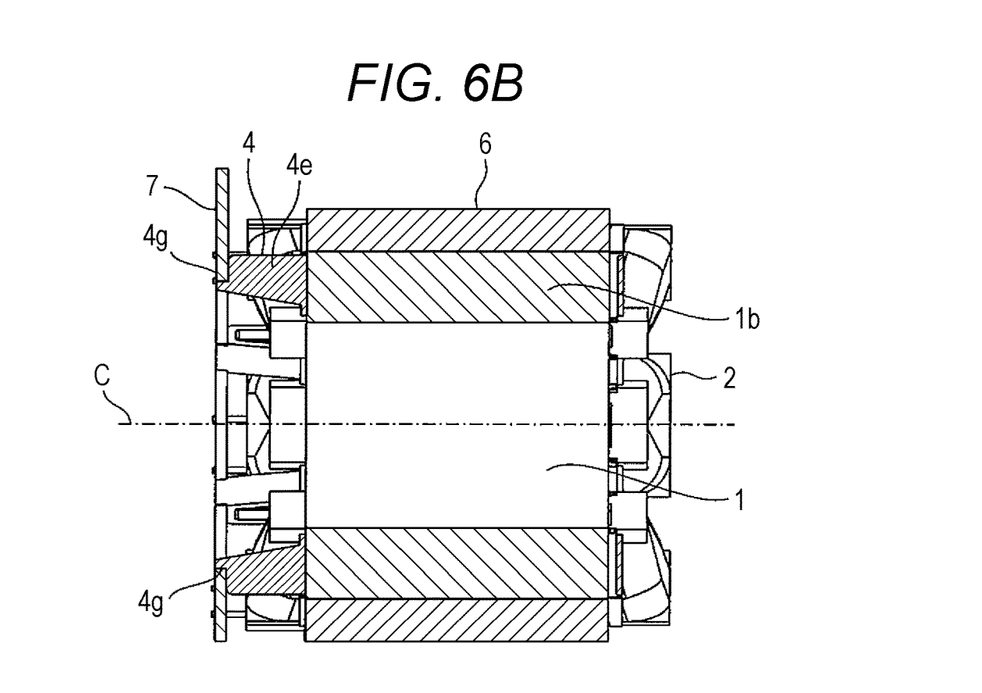
FIG. 6B is a cross-sectional view.

FIG. 6A is a perspective view of an assembled printed board structure where a printed board has been assembled in the assembled armature yoke structure according to the embodiment. FIG. 6B is a cross-sectional view along line VIa-VIb in FIG. 6A.

The structure illustrated in FIG. 6A is a structure where a printed board 7 is affixed to an end surface of the armature yoke 6 in the structure illustrated in FIG. 5.

As described above, according to the embodiment, resin molding can be performed in such a manner that molding resin is enabled to reach the coil in the assembled armature yoke structure. Moreover, the opening portion is provided to allow improving the heat dissipation effect. In addition, the movement of the winding bobbin and the empty bobbin in the rotation axis direction can be regulated to fix the winding bobbin and the empty bobbin.

Third Embodiment

A third embodiment of the present disclosure is described below.

In the third embodiment of the present disclosure, a base portion 4e protruding (extending) outward of the iron core 1 in the rotation axis C direction from a side surface of the empty bobbin 4 in the rotation axis C direction is formed as illustrated in FIGS. 3A and 3B. A base 4g is formed on a distal end side of the base portion 4e in the rotation axis C direction. A substantially flat mounting surface where an end portion on the inner or outer peripheral side of the doughnut-shaped printed board can abut and be mounted is provided on the base 4g.

As illustrated in FIGS. 3A and 3B, the printed board 7 can be positioned by the mounting surface of the base 4g provided at the end portion of the base portion 4e of the empty bobbin in FIGS. 3A and 3B. Such a base portion 4e allows determining the position of the inner or outer diameter of the doughnut-shaped printed board 7.

The empty bobbin 4 is provided with the base portion 4e including the base 4g for the printed board 7. Accordingly, the base portion 4e can be provided located on the outer peripheral side in the radial direction as illustrated in the cross-sectional views of FIGS. 6A and 6B.

Figure 7A:
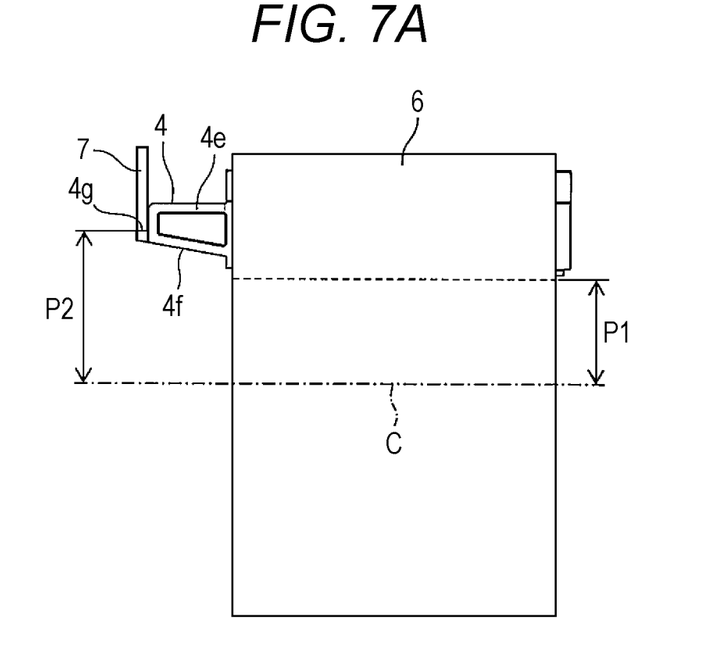
FIGS. 7A and 7B are side views illustrating a configuration where a base portion is affixed to the yoke.
Figure 7B:
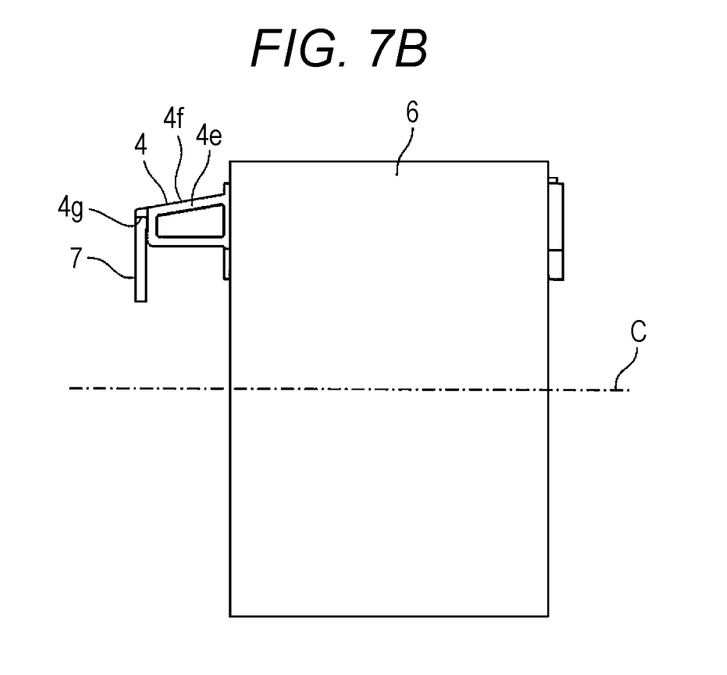

FIGS. 7A and 7B are side views illustrating a configuration where the base portion 4e is affixed at one end of the yoke 6. As illustrated in FIG. 7A, the base 4g of the base portion 4e is placed in such a manner that the position of the base 4g is on the outer peripheral side with respect to an inner diameter P1 of the core when the base portion 4e is affixed to the yoke 6.

Consequently, there is an advantage that the inner diameter of the flat doughnut-shaped printed board 7 affixed to the base 4g of the base portion 4e can be increased as compared to the inner diameter of the core (the reference numeral C denotes the center line of the core, and P1 denotes the inner diameter of the core; the same hereinafter).

The above configuration allows increasing an inner periphery P2 of the printed board 7 as compared to the inner diameter P1 of the core. The inner diameter P2 of the printed board 7 is increased as compared to the inner diameter P1 of the core. Accordingly, the molding resin passage in the rotation axis C direction can be sufficiently secured.

If the inner diameter of the core is large, a component (such as a bracket or bearing) can be placed below a molded resin portion 11. Consequently, the entire length of the motor in the rotation axis C direction can be reduced.

On the other hand, in the embodiment, the inner diameter P1 of the core can be reduced. Incidentally, assume that the size of a bearing used is the same. If the inner diameter P1 of the core is reduced as in the embodiment, it is difficult to place a bracket or the like below the molded resin 11.

Figure 8:
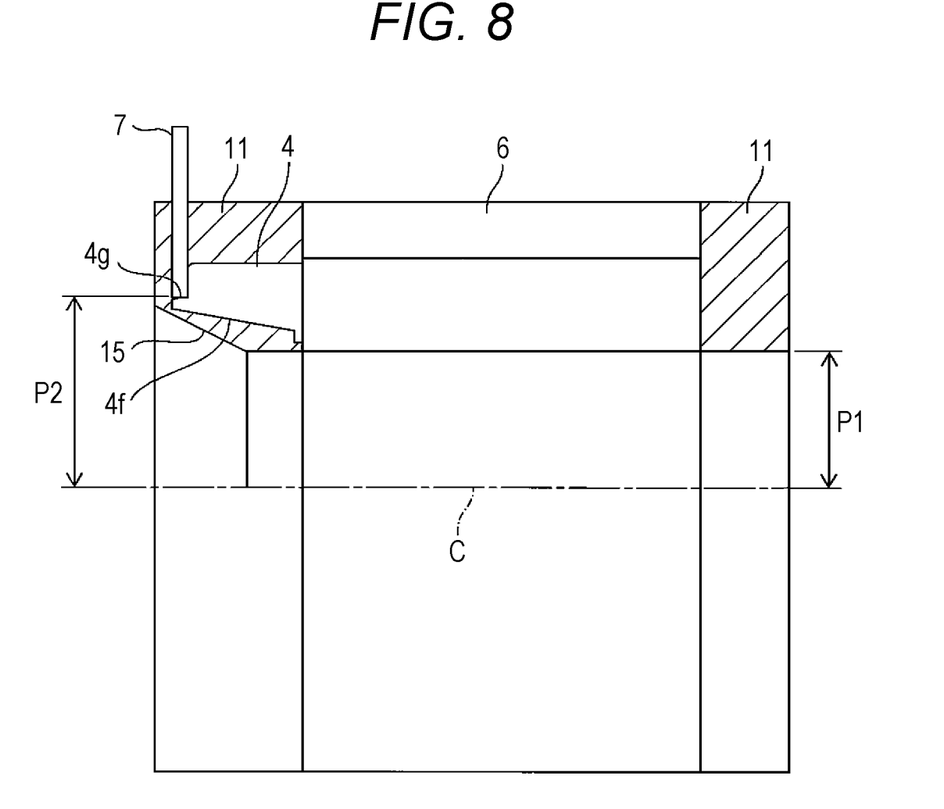
FIG. 8 is a cross-sectional view of a molded structure obtained from the state of FIG. 7A.

Hence, in the embodiment, a tapered portion 4f of a taper shape where the width of the base portion 4e in the radial direction is reduced toward the outer side in the rotation axis C direction, that is, the thickness is gradually reduced toward the outer side, may be provided on a side opposite to the mounting surface of the base 4g of the base portion 4e as illustrated in FIG. 7A or 8. Consequently, the tapered portion 15 can also be formed on the molded resin 11.

Therefore, a component such as a bracket or bearing can be placed below the taper(ed portion) 15. Consequently, the entire length of the motor can be reduced as compared to a case where a component such as a bracket or bearing is placed outward of the molded resin portion 11 in the rotation axis C direction.

In a case of a configuration where the base portion is provided on the winding bobbin side, if the base portion is tapered, the area where a wire can be wound is reduced. If the windable area is reduced, a part where the winding overlap itself increases accordingly, which results in increasing the entire length of the motor.

If the base portion is provided to the winding bobbin, and if the base portion is not tapered, the winding is also molded straight in the molding process. Accordingly, the tapered portion cannot be formed on the molded resin. Therefore, a component such as a bracket or bearing ends up in being placed outward of the winding bobbin. As a result, the entire length of the motor increases (undesirably).

On the other hand, in the embodiment, the base portion 4e is provided to the empty bobbin 4 around which the coil 3 is not wound. Hence, the base portion 4e can be formed extending at any angle.

Therefore, as in the embodiment, the base portion 4e is extended outward in the rotation axis C direction as the tapered portion 4f of the base portion 4e on the inner dimeter side of the iron core 1. Accordingly, a lower part of the molded resin portion 11 also serves as the tapered portion 15 of a taper shape, Consequently, a component or the like can be placed below the tapered portion 15. Therefore, the entire length of the motor can be reduced.

On the other hand, if the base portion 4e is affixed in such a manner as to be symmetric about a line along the rotation axis C with respect to FIG. 7A as illustrated in FIG. 7B, the end portion on the outer peripheral side of the doughnut-shaped printed board 7 can be placed on the base 4g. Moreover, the tapered portion 4f is formed on the outer dimeter side of the iron core 1. Hence, the outer diameter of the printed board 7 can be reduced as compared to the outer diameter of the core.

In addition, the tapered portion 15 is also formed on the molded resin on the basis of the tapered portion 4f of the base portion 4e. Hence, it is possible to prevent a component placed outward of the base portion 4e in the rotation axis C direction from interfering with the molded resin portion 11.

As described above, according to the embodiment, in the armature structure including the main pole into which the winding bobbin around which the coil is wound is inserted, and the auxiliary pole into which the coil is not inserted, the unwound empty bobbin is inserted into the auxiliary pole, the flange portions of both of the winding bobbin and the empty bobbin are caused to overlap each other. Consequently, an improvement in the insulation performance of the bobbin structure of the armature can be promoted. Furthermore, a groove or hole is provided in a part of the empty bobbin to integrally form the iron core and the winding with resin. Consequently, the heat transfer properties can be improved while the insulation distance between the coil and the magnetic pole is secured.

Furthermore, the empty bobbin is provided with the base portion extending in the direction of the rotation axis of the motor to have the structure of holding the board. The degree of freedom is given to the inner diameter of the board. Accordingly, the resin passage can be secured.

The present disclosure is not limited to the illustrated configurations and the like in the above embodiments, and can be modified as appropriate within the scope that exerts the effects of the embodiments. In addition, the present disclosure can be modified and carried oust as appropriate without departing from the scope of the object of the present disclosure.

Moreover, each constituent element of the embodiments can be freely selected, and a disclosure including the selected configuration is also included in the present disclosure.

Moreover, the bobbin structure of the armature according to one embodiment of the present disclosure is such a bobbin structure of an armature as described below, which is a bobbin structure of an armature where, in a three-phase motor having 6N (N is a natural number) slots of a motor armature, and 3N coils per phase, a main pole into which a winding bobbin around which a coil is wound is inserted, and an auxiliary pole into which an empty bobbin around which the coil is not wound is inserted are placed in a circumferential direction with respect to a rotation axis, characterized in that a contact portion where the empty bobbin and the winding bobbin are in contact with each other is formed on each of an outer peripheral side and an inner peripheral side of the slot formed between the main pole and the auxiliary pole.

The foregoing detailed description has been presented for the purpose of illustration and description. Many modifications and variations are possible in light of the above teaching. It is not intended to be exhaust or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

The present disclosure can be used for a bobbin structure of an armature.

What is claimed is:

1. A bobbin structure of an armature of a three-phase motor having 6N (N is a natural number) slots and 3N coils, the bobbin structure comprising:
   a main pole into which a winding bobbin around which a coil is wound is inserted; and
   an auxiliary pole into which an empty bobbin around which the coil is not wound is inserted; and
   a resin filling a gap between the auxiliary pole and the empty bobbin, wherein
   the main pole and the auxiliary pole are placed in a circumferential direction with respect to a rotation axis, and
   a contact portion where the empty bobbin and the winding bobbin are in contact with each other is formed on each of an outer peripheral side and an inner peripheral side of the slot formed between the main pole and the auxiliary pole.

2. The bobbin structure of the armature according to claim 1,
   wherein
   the empty bobbin comprises a housing portion where the auxiliary pole is inserted and housed.

3. The bobbin structure of the armature according to claim 1,
   wherein
   the empty bobbin comprises a first side wall portion and a second side wall portion provided on each side of a housing portion of the empty bobbin where the auxiliary pole is inserted and housed.

4. The bobbin structure of the armature according to claim 3,
   wherein
   inner surfaces of the first side wall portion and the second side wall portion of the housing portion are in direct contact with the auxiliary pole.

5. The bobbin structure of the armature according to claim 3,
   wherein
   the empty bobbin comprises flange portions configured in such a manner that a distance between the flange portions increases from the side wall portions toward an outer peripheral side with respect to the rotation axis of the bobbin structure.

6. The bobbin structure of the armature according the claim 3, wherein
   the first and second side wall portions have flange portions respectively configured in such a manner that the distance between the flange portions increases gradually from the first and second side wall portions toward the outer peripheral side, and
   the bobbin structure has two triangular gaps, taken perpendicular to the rotation axis of the armature, on either side of the auxiliary pole and between the auxiliary pole and the flange portions.

7. The bobbin structure of the armature according to claim 1, wherein
   the gap between the auxiliary pole and the empty bobbin has a triangular cross-section shape, taken perpendicular to the rotation axis of the armature, that narrows in width towards the rotation axis.

8. A bobbin structure of an armature of a three-phase motor having 6N (N is a natural number) slots and 3N coils, the bobbin structure comprising:
   a main pole into which a winding bobbin around which a coil is wound is inserted; and
   an auxiliary pole into which an empty bobbin around which the coil is not wound is inserted, wherein
   the main pole and the auxiliary pole are placed in a circumferential direction with respect to a rotation axis,
   a contact portion where the empty bobbin and the winding bobbin are in contact with each other is formed on each of an outer peripheral side and an inner peripheral side of the slot formed between the main pole and the auxiliary pole,
   in the contact portion on the outer peripheral side of the slot, at least parts of the empty bobbin and the winding bobbin fit together, and
   the contact portion includes an opening portion.

9. A bobbin structure of an armature of a three-phase motor having 6N (N is a natural number) slots and 3N coils, the bobbin structure comprising:
   a main pole into which a winding bobbin around which a coil is wound is inserted; and an auxiliary pole into which an empty bobbin around which the coil is not wound is inserted, wherein the main pole and the auxiliary pole are placed in a circumferential direction with respect to a rotation axis, a contact portion where the empty bobbin and the winding bobbin are in contact with each other is formed on each of an outer peripheral side and an inner peripheral side of the slot formed between the main pole and the auxiliary pole, and a groove or hole is formed on an outer peripheral side of the empty bobbin.

10. A bobbin structure of an armature of a three-phase motor having 6N (N is a natural number) slots and 3N coils, the bobbin structure comprising:

a main pole into which a winding bobbin around which a coil is wound is inserted;

an auxiliary pole into which an empty bobbin around which the coil is not wound is inserted; and a base portion including, at an end portion thereof, a base having a mounting surface where an end portion on an inner or outer diameter of a printed board is mounted, the base portion protruding from a side surface of the empty bobbin in a rotation axis direction, wherein the main pole and the auxiliary pole are placed in a circumferential direction with respect to the rotation axis, and a contact portion where the empty bobbin and the winding bobbin are in contact with each other is formed on each of an outer peripheral side and an inner peripheral side of the slot formed between the main pole and the auxiliary pole.

11. The bobbin structure of the armature according to claim 10, further comprising a tapered portion of a taper shape where the base portion tapers to an outer side in the rotation axis direction, on a surface opposite to the mounting surface of the base portion.

* * * * *